(12) United States Patent
Kannenberg et al.

(10) Patent No.: US 10,077,757 B2
(45) Date of Patent: Sep. 18, 2018

(54) ROTOR BLADE AND CONNECTING DEVICE

(71) Applicant: WOBBEN PROPERTIES GMBH, Aurich (DE)

(72) Inventors: Johannes Kannenberg, Aurich (DE); Alexander Hoffmann, Emden (DE)

(73) Assignee: Wobben Properties GmbH, Aurich (DE)

( * ) Notice: Subject to any disclaimer, the term of this patent is extended or adjusted under 35 U.S.C. 154(b) by 502 days.

(21) Appl. No.: 14/363,241

(22) PCT Filed: Nov. 28, 2012

(86) PCT No.: PCT/EP2012/073793
§ 371 (c)(1),
(2) Date: Jun. 5, 2014

(87) PCT Pub. No.: WO2013/083451
PCT Pub. Date: Jun. 13, 2013

(65) Prior Publication Data
US 2014/0334934 A1    Nov. 13, 2014

(30) Foreign Application Priority Data

Dec. 8, 2011    (DE) .................. 10 2011 088 025
Nov. 19, 2012   (DE) .................. 10 2012 221 117

(51) Int. Cl.
*F03D 1/06*    (2006.01)

(52) U.S. Cl.
CPC ......... *F03D 1/0658* (2013.01); *F03D 1/0675* (2013.01); *F05B 2240/302* (2013.01); *F05B 2260/301* (2013.01); *Y02E 10/721* (2013.01)

(58) Field of Classification Search
CPC .................. F03D 1/0658; F05D 2240/302
See application file for complete search history.

(56) References Cited

U.S. PATENT DOCUMENTS

| 6,371,730 | B1 | 4/2002 | Wobben |
| 7,980,827 | B2 | 7/2011 | Stiesdal |
| 8,142,157 | B2 | 3/2012 | Kita et al. |
| 8,192,170 | B2 | 6/2012 | Rohden |
| 8,348,622 | B2 | 1/2013 | Bech |

(Continued)

FOREIGN PATENT DOCUMENTS

| DE | 943880 | 6/1956 |
| DE | 31 09 566 A1 | 10/1982 |

(Continued)

*Primary Examiner* — Dwayne J White
*Assistant Examiner* — Jason Davis
(74) *Attorney, Agent, or Firm* — Seed IP Law Group LLP

(57) ABSTRACT

A rotor blade of a wind power installation for fixing to a rotor hub and having a rotor blade longitudinal axis, including a rotor blade inner part towards the rotor hub, and a rotor blade outer part away from the rotor hub, wherein the rotor blade inner part and the rotor blade outer part are connected together by means of at least one connecting device and the connecting device includes at least one anchoring element anchored in the rotor blade outer part, at least one counterpart element anchored in the rotor blade inner part, and at least one connecting bolt which extends through the counterpart element and is fixed in the anchoring element.

21 Claims, 11 Drawing Sheets

(56) References Cited

U.S. PATENT DOCUMENTS

| | | | |
|---|---|---|---|
| 8,376,713 B2* | 2/2013 | Kawasetsu | F03D 1/001 416/226 |
| 8,510,947 B2* | 8/2013 | Kirkpatrick | B23P 15/04 29/411 |
| 8,777,573 B2 | 7/2014 | Hibbard et al. | |
| 2009/0226320 A1 | 9/2009 | Torres Martinez | |
| 2011/0091326 A1* | 4/2011 | Hancock | F03D 1/0675 416/225 |
| 2011/0243736 A1* | 10/2011 | Bell | F03D 1/0675 416/132 R |
| 2011/0293432 A1 | 12/2011 | Hibbard et al. | |
| 2012/0141287 A1* | 6/2012 | Hynum | F03D 1/0675 416/235 |

FOREIGN PATENT DOCUMENTS

| | | |
|---|---|---|
| DE | 197 33 372 C1 | 1/1999 |
| DE | 199 62 989 B4 | 4/2006 |
| DE | 10 2006 022 279 A1 | 11/2007 |
| DE | 10 2006 014 742 B4 | 1/2008 |
| DE | 20 2011 101 634 U1 | 9/2011 |
| DE | 10 2011 088 025 A1 | 6/2013 |
| EP | 1 398 499 A1 | 3/2004 |
| EP | 1 798 412 A2 | 6/2007 |
| EP | 1 950 414 A2 | 7/2008 |
| EP | 1956235 A1 * | 8/2008 ........... F03D 1/0658 |
| ES | 2 333 499 A1 | 2/2010 |
| FR | 1.187.166 A | 9/1959 |
| JP | 2004-011616 A | 1/2004 |
| JP | 2008-180102 A | 8/2008 |
| RU | 2002106 C1 | 10/1993 |
| RU | 2392486 C1 | 6/2010 |
| WO | 01/42647 A2 | 6/2001 |
| WO | 2006/002621 A1 | 1/2006 |
| WO | 2006/056584 A1 | 6/2006 |
| WO | 2007/131937 A1 | 11/2007 |
| WO | 2010/086297 A2 | 8/2010 |
| WO | 2013/075718 A1 | 5/2013 |
| WO | 2013/083451 A1 | 6/2013 |

* cited by examiner

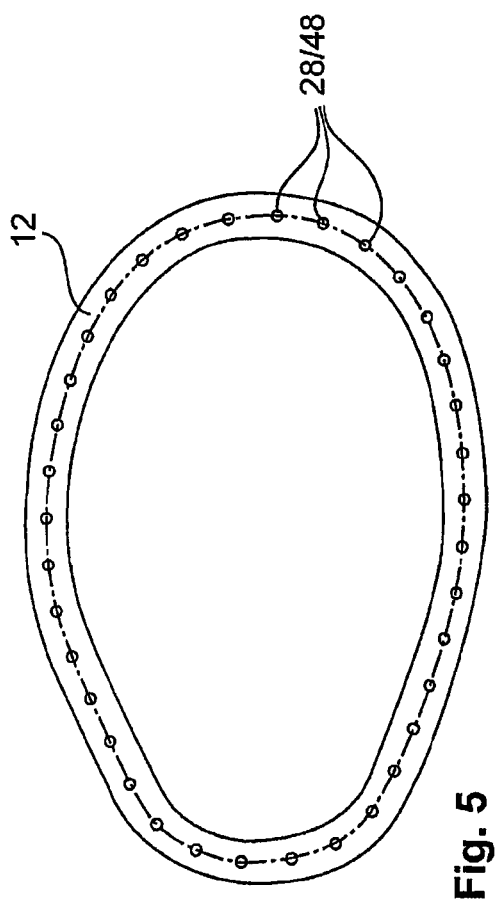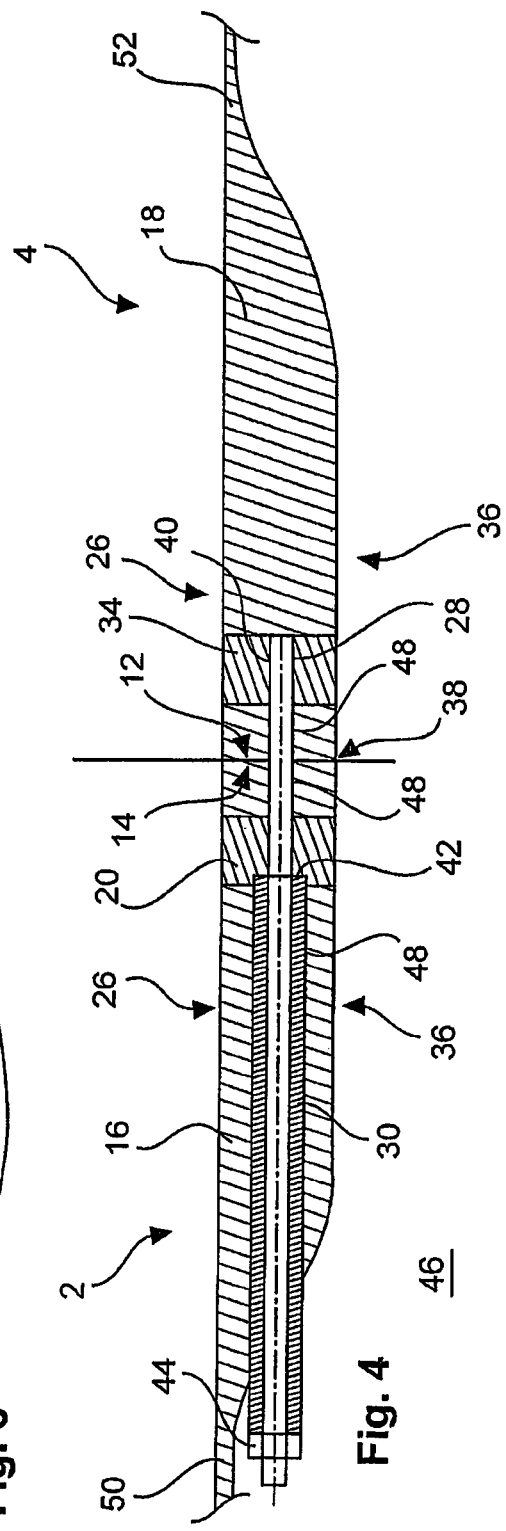

ROTOR BLADE AND CONNECTING DEVICE

BACKGROUND

Technical Field

The present invention concerns a rotor blade of a wind power installation, in particular a substantially two-part rotor blade. The invention further concerns a wind power installation comprising such a rotor blade.

Description of the Related Art

Rotor blades of wind power installations have long been known. The present invention concerns in particular rotor blades of a so-called horizontal-axis wind power installation, namely a wind power installation in which one or more rotor blades form an aerodynamic rotor and as intended rotate about a substantially horizontal axis which can also be slightly tilted. Such a wind power installation is also shown in FIG. 1.

In that respect modern wind power installations are nowadays of increasingly large rotor diameters and thus longer rotor blades. That gives rise increasingly to problems when transporting the rotor blades to the erection location, because of the increasing size of the rotor blades.

For example, on the wind power installation of type E126 from Enercon it is known to use a divided rotor blade which inter alia is sub-divided into two parts in the direction of the rotor blade longitudinal axis, an inner part and an outer part. In that case the inner part is made of steel. Accordingly this gives a rotor blade a high mass, which can be a disadvantage in many aspects. The weight of the rotor of the wind power installation is increased and therewith also the weight of the pod of the wind power installation. To be able to carry the higher masses of the rotor on the pod, modifications may also be required there, and they can lead to an additional increase in the weight of the pod. In addition transportation and also in particular installation of such rotor blade parts of steel is complicated and expensive and makes it necessary to use a correspondingly large crane which is designed for the loads involved.

The German Patent and Trade Mark Office searched the following state of the art in the priority application: DE 10 2006 014 742 B4, DE 199 62 989 B4, DE 10 2006 022 279 A1, DE 20 2011 101 634 U1, EP 1 798 412 A2 and EP 1 398 499 A1.

BRIEF SUMMARY

One or more embodiments of the invention are directed to addressing at least one of the above-mentioned problems. In particular the invention seeks to provide a rotor blade which is as light as possible and at the same time large and which is comparatively easy to transport. The invention seeks at least to propose an alternative solution.

According to one embodiment of the invention there is proposed a rotor blade according to claim 1.

Such a rotor blade of a wind power installation is intended for fixing to a rotor hub and has a rotor blade longitudinal axis. The rotor blade includes at least a rotor blade inner part and a rotor blade outer part. The rotor blade inner part is intended to face towards the rotor hub and in that case is preferably fixed directly or indirectly to the rotor hub. The rotor blade outer part faces away from the rotor hub and thus faces towards a rotor blade tip and can also include same. The rotor blade thus substantially consists of the rotor blade inner part and the rotor blade outer part in the rotor blade longitudinal axis. Further components like a rotor blade rear box section which increases the width of the rotor blade in particular in the region near the hub can also be provided. The fact that the rotor blade substantially comprises the rotor blade inner part and the rotor blade outer part is to be understood in particular in the sense of the local extent along the rotor blade longitudinal axis. More specifically the rotor blade extends in particular from the rotor hub to the rotor blade tip so that the rotor blade inner part extends from the rotor hub to the rotor blade outer part and the rotor blade outer part extends from the rotor blade inner part to the rotor blade tip.

The rotor blade inner part is connected to the rotor blade outer part by means of at least one connecting device. Preferably there are provided a plurality of connecting devices, in particular a multiplicity like for example 20 to 50 connecting devices or even more. Each of those connecting devices, but at least one thereof, includes at least one anchoring element anchored in the rotor blade outer part. That anchoring element is embedded in particular in the rotor blade outer part. It can be arranged there directly in manufacture of the rotor blade or it can be subsequently anchored in the rotor blade outer part by the provision of suitable openings such as for example bores.

In addition the connecting device includes at least one counterpart element anchored in the rotor blade inner part. That counterpart element, similarly to the anchoring element in the rotor blade outer part, can be embedded in the rotor blade inner part, more specifically it can be arranged there in manufacture of the rotor blade inner part or it can be subsequently arranged and anchored in the rotor blade inner part.

In addition there is provided a connecting bolt which is fixed in the anchoring element and is thus anchored by way of the anchoring element and by way of the rotor blade outer part. The connecting bolt then extends from the anchoring element and thus from the rotor blade outer part to the rotor blade inner part and there through the counterpart element. Preferably in that respect the connecting bolt is not fixed in the counterpart element. In particular it is basically displaceable in the longitudinal direction of the connecting bolt as long as it is not fixed by a further element such as a bracing element. In particular the counterpart element does not have a female thread.

According to an embodiment the rotor blade is characterized in that the rotor blade inner part and/or the rotor blade outer part respectively substantially comprises a fiber-reinforced plastic. In particular a glass fiber-reinforced plastic or carbon fiber-reinforced plastic is proposed for one of the two parts or both parts. In that respect the solution according to the invention provides a particularly advantageous possible way of connecting two rotor blade parts of fiber-reinforced plastic together. The anchoring element and/or the counterpart element can basically be embedded in the production of such a fiber-reinforced plastic. In particular it can be enclosed by resin or glass fiber or carbon fiber mats impregnated in plastic.

A preferred option however provides that the rotor blade inner part and/or the rotor blade outer part are firstly produced without the anchoring element or the counterpart element respectively and they are later fitted. The anchoring element and the counterpart element are thus in the form of independent elements which preferably are not themselves made from fiber-reinforced plastic but in particular from metal. In that respect the rotor blade inner part and/or the rotor blade outer part does not comprise completely fiber-reinforced plastic because for example additional elements like also such a reinforcing element or counterpart element are included, which do not comprise fiber-reinforced plastic.

In addition further elements such as for example reinforcing elements of other materials than fiber-reinforced plastic can also be provided in the fiber-reinforced plastic, like for example also wood elements.

When connecting such rotor blade parts of fiber-reinforced plastic the anchoring element and the counterpart element firstly carry corresponding connecting forces which are preferably distributed to many connecting devices and thus to many anchoring elements and counterpart elements. That connecting force is then applied from the anchoring element or counterpart elements respectively to the material of the rotor blade outer part and the rotor blade inner part respectively. The force is thus distributed and high point forces which act on a fiber-reinforced plastic are avoided.

Preferably the anchoring element is in the form of a transverse bolt having a bolt axis arranged substantially transversely to the rotor blade longitudinal axis. Preferably the at least one anchoring element is arranged in a shell of the rotor blade outer part and faces with its bolt axis to the inner region, in particular to the internal space, of the rotor blade outer part. In that case the anchoring element can be easily inserted in the direction of the bolt axis into a corresponding bore or other opening in the shell of the rotor blade outer part and anchored there.

It is desirable for the anchoring element to be provided with a bore having a female thread, the bore being arranged transversely relative to the bolt axis and as required substantially parallel to the rotor blade longitudinal axis. The connecting bolt can be fixingly accommodated in that bore with the female thread and in particular the connecting bolt can be screwed into such a female thread. That configuration can be such that the anchoring element in the form of the transverse bolt is pushed into a corresponding opening, in particular a bore, basically from the outside inwardly, into the shell in question of the rotor blade outer part, and anchored.

In addition there is provided a longitudinal bore which is substantially parallel to the rotor blade longitudinal axis and which extends from an abutment surface of the outer part provided for fitment to an abutment surface of the rotor blade inner part, to the corresponding anchoring element. The connecting bolt can be inserted through that bore which can be produced while the anchoring element is not yet inserted, and finally screwed into the corresponding bore with thread in the anchoring element. The connecting bolt is substantially fixedly anchored in that position in the rotor blade outer part. Preferably very many anchoring elements with connecting bolts in the rotor blade outer part are provided in that way. For making a connection between the rotor blade outer part and the rotor blade inner part however it may be advantageous for the connecting bolts firstly not to be fixed in the anchoring element.

It is preferably proposed that the counterpart element is in the form of a transverse bolt with a bolt axis arranged substantially transversely relative to the rotor blade longitudinal axis. It is also desirable for the counterpart element to be arranged in a shell of the rotor blade inner part, in particular directed with the bolt axis to the interior and in particular the internal space in the rotor blade inner part. For that purpose it is possible to provide a corresponding bore in the shell of the rotor blade outer part for each counterpart element.

Preferably there is provided a bore from a or the abutment surface of the rotor blade inner part which is provided for attachment to a or the abutment surface of the rotor blade outer part, at least to the intended position of the counterpart element. Such a bore is also to be provided substantially parallel to the rotor blade longitudinal axis. Preferably such a longitudinal bore extends in the rotor blade outer part completely from a or the abutment surface for attachment to the rotor blade outer part through a or the anchoring region of the rotor blade inner part to an inner region of the rotor blade inner part where the longitudinal bore emerges by virtue of the reduction in material thickness.

To connect the rotor blade outer part to the rotor blade inner part it is thus proposed that the connecting bolt extends from the anchoring element and thus from the rotor blade outer part through the corresponding longitudinal bore to the rotor blade inner part and there further through the counterpart element. Thus the connecting bolt is firstly fixedly connected to the anchoring element but not to the counterpart element. Fixing is then effected at a side of the counterpart element, that is remote from the anchoring element, with a clamping means, in particular a screw nut, for bracing against the counterpart element in order thereby to pull the anchoring element and the counterpart element against each other. The clamping means is thus fitted onto the connecting bolt and pushed thereon against the counterpart element. That can be effected for example in such a way that provided on the connecting bolt is a corresponding male thread on which the clamping means is screwed directly or indirectly against the counterpart element.

Preferably arranged between the counterpart element and the clamping means is an expansion sleeve, in particular being pushed over the connecting bolt. The clamping means then produces a bracing action indirectly by way of that expansion sleeve.

Taking the example of a screw nut as the clamping element, it is screwed onto the connecting bolt in a direction towards the counterpart element, in that case pushes the expansion sleeve against the counterpart element and thereby forms the bracing action. The expansion sleeve elastically yields in that case so that a clamping force is exerted. When slight material fatigue phenomena occur, if for example the connecting bolt experiences minimal stretching, the material of the rotor blade outer part and/or the rotor blade inner part, that is arranged between the anchoring element and the counterpart element, yields somewhat, then the expansion sleeve can counteract such material fatigue by expanding, in which case the forces of the bracing arrangement remain at least partially maintained.

Preferably in the region of the through bore the counterpart element has a flattened contact surface or a contact surface which is adapted in some other way for fitment of the clamping means or the expansion sleeve. In that way the force acting from the clamping means and/or the expansion sleeve on the counterpart element upon being braced can be distributed. That is particularly advantageous when the counterpart element is in the form of a cylindrical transverse bolt, in particular of circular cross-section.

In an embodiment there is proposed a rotor blade characterized in that the rotor blade outer part, in the region of the anchoring element, and also or alternatively the rotor blade inner part in the region of the counterpart element, respectively have an anchoring region of greater material thickness than the rest of the rotor blade shell, or a greater material thickness than the average material thickness of the rotor blade shell. Thus there is provided a peripherally extending thickened region, wherein that thickening or increased material thickness is provided inwardly, that is to say radially inwardly. In particular a longitudinal bore is provided in the anchoring region of the rotor blade outer part and/or the rotor blade inner part, for each connecting device. It is substantially parallel to the rotor blade longitudinal axis and thus also approximately parallel to the rotor blade surface in the region in question. When using many connecting devices therefore there are many longitudinal bores which in particular are distributed approximately uniformly in the peripheral direction in the anchoring region.

Preferably the longitudinal bore in the rotor blade outer part extends from an abutment surface for fitment to the rotor blade inner part to a transverse bore for receiving the anchoring portion so that the connecting bolt can extend from the abutment surface to the anchoring bolt.

For the rotor blade inner part it is preferably proposed that the longitudinal bore in the rotor blade outer part extends with an abutment surface for fitment to the rotor blade outer part completely through the anchoring region to end in an inner region of the rotor blade inner part in which the material thickness is so thin that the bore emerges completely from the anchoring region so that the connecting bolt can extend from the abutment surface into the inner region. Accordingly different configurations are proposed for the longitudinal bore in the rotor blade outer part on the one hand and in the rotor blade inner part on the other hand. In the rotor blade inner part the longitudinal bore forms a through bore whereas in the rotor blade outer part it extends only to the corresponding transverse bolt and can also be referred to a blind hole.

That makes it possible for the connecting bolt to extend from the anchoring bolt to the rotor blade inner part and there to extend completely through the anchoring region, namely in both cases along the longitudinal bore. An end of the connecting bolt is thus fixed in the anchoring bolt and anchored thereto there while the other end of the connecting bolt projects out of the anchoring portion of the rotor blade inner part and there extends into the inner region of the rotor blade inner part. Therefore a clamping means can be easily arranged at that second end and can be actuated from the inside region of the rotor blade inner part and in particular can be tightened. The connection of the rotor blade outer part to the rotor blade inner part can thus be easily implemented, which permits bracing from the rotor blade inner part. There is therefore no need to go into the rotor blade outer part. In that case, making the connection, tightening it and producing the bracing action can be effected both prior to installation of the rotor blade on the wind power installation, such as for example on site on the building site before the rotor blade is lifted up and installed. Alternatively a connection can also be made when the rotor blade inner part is already fixed to the rotor hub. When the rotor blade inner part is disposed horizontally, it can be readily entered from the hub from the inside, depending on its respective structural shape and size.

It is also possible easily and without exposing service personnel to unnecessary dangers to check the connection between the rotor blade outer part and the rotor blade inner part in respect of its strength, for example after a maintenance interval. Here the rotor blade outer part can also be removed and replaced by service personnel releasing the connection of the two rotor blade parts from the rotor blade inner part.

In a further embodiment the connecting devices or a respective part thereof are arranged in a plurality of rows, in particular relative to a rotor blade central axis, in an inner and an outer row. The loads occurring can thereby be distributed to a wider region. Thus, using an inner row and an outer row involves a two-row configuration. The use of a plurality of rows leads in particular to a widening of the load region in comparison with the use of only one row.

Preferably or alternatively the connecting devices each have a plurality of connecting bolts. An advantageous configuration in that respect is one in which a connecting device respectively has an anchoring element, a counterpart element and a plurality of and in particular two connecting bolts. When the two rotor blade parts are connected together, a respective anchoring element and a counterpart element are braced against each other. In that bracing procedure, the provision of a plurality of connecting bolts means that corresponding clamping forces are respectively distributed over the anchoring element and over the counterpart element.

A further embodiment proposes that the connecting device is of such a configuration that the or each connecting bolt extends through the anchoring element to an expansion sleeve and is screwed in the expansion sleeve at a fixing portion remote from the anchoring element to the expansion sleeve. That affords an expansion portion of the expansion sleeve between the fixing portion and the anchoring element against which the expansion sleeve bears and against which the expansion sleeve is pulled in the braced condition of the connecting device by the connecting bolt. In that way the expansion sleeve can provide a clamping action for bracing the connecting device without the bracing effect having to be effected at a bracing means directly at the expansion sleeve.

In addition there is proposed a connecting device for connecting a rotor blade inner part to a rotor blade outer part. The connecting device is of a configuration as is apparent hereinbefore from the description of the connection between the rotor blade inner part and the rotor blade outer part.

There is also proposed a wind power installation having at least one rotor blade, in particular three rotor blades, which is or are of a configuration according to at least one described embodiment of a rotor blade according to the invention.

BRIEF DESCRIPTION OF THE SEVERAL VIEWS OF THE DRAWINGS

The invention is described in greater detail hereinafter by means of embodiments by way of example with reference to the accompanying Figures.

FIG. 4 shows a sectional view of a connecting region of a divided rotor blade, FIG. 5 shows a plan view of an abutment surface of a rotor blade inner part.

DETAILED DESCRIPTION

Identical references hereinafter can denote similar but non-identical elements in order to emphasize the functional relationship thereof.

Figure 1:
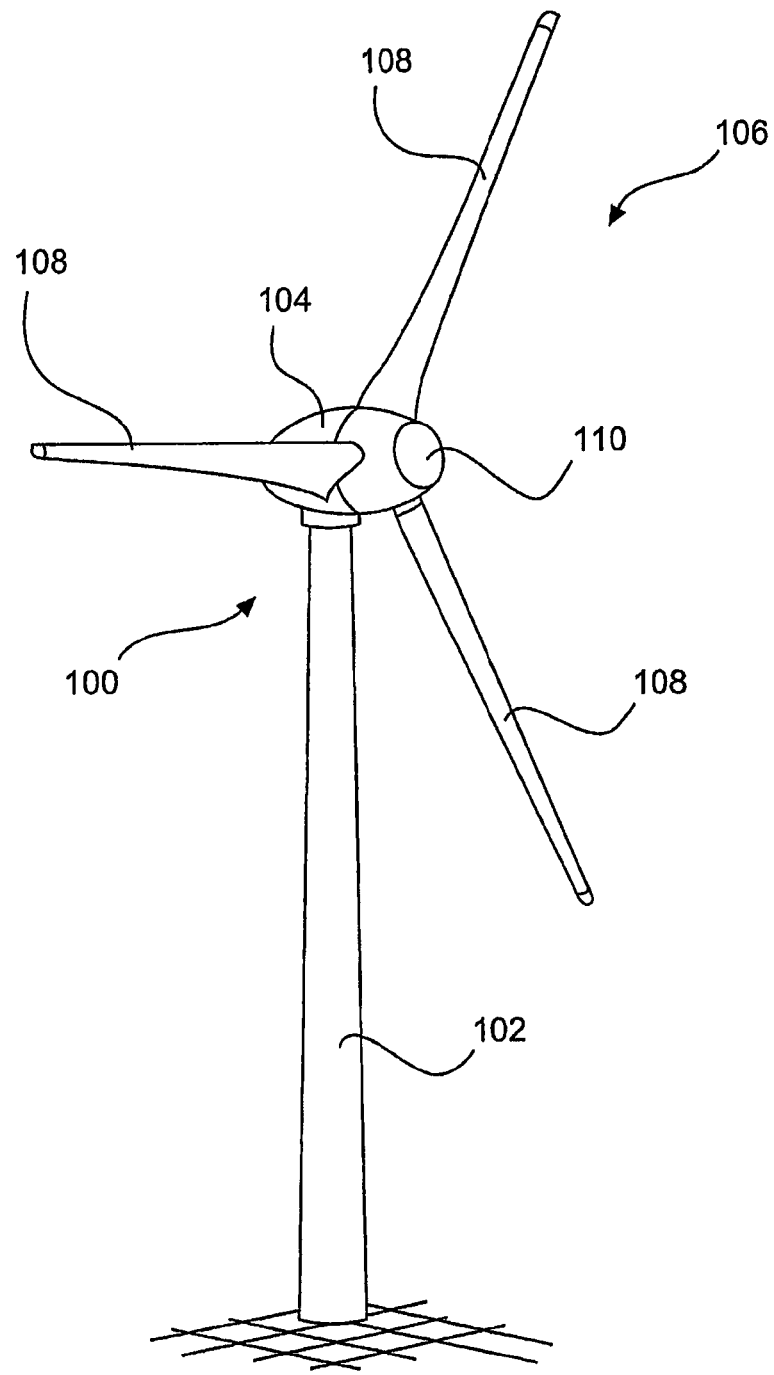
FIG. 1 shows a perspective view of a wind power installation.

FIG. 1 shows a wind power installation 100 comprising a pylon 102 and a pod 104. Arranged on the pod 104 is a rotor 106 having three rotor blades 108 and a spinner 110. In operation the rotor 106 is caused to rotate by the wind and thereby drives a generator in the pod 104.

Figure 2:
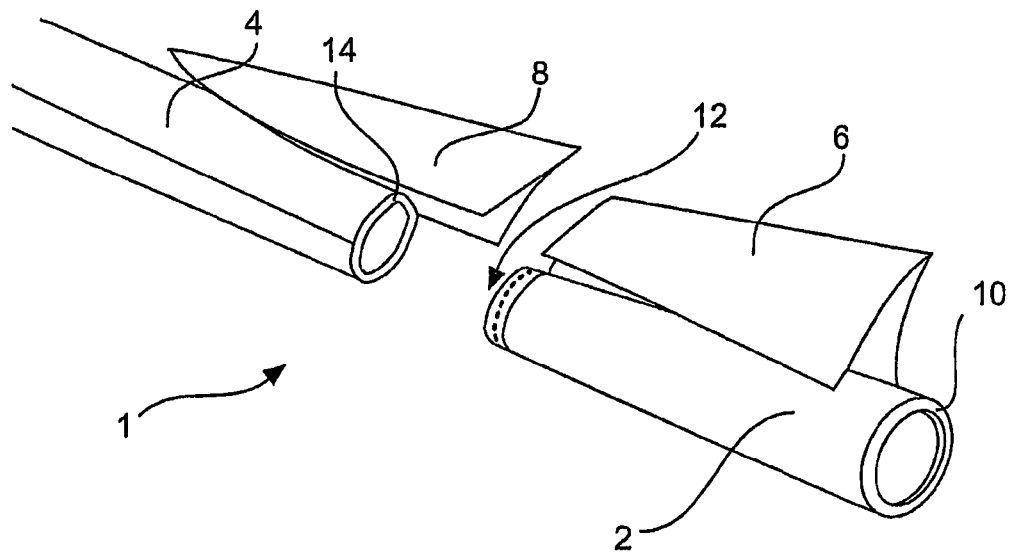
FIG. 2 shows a perspective view of a divided rotor blade in a view based on an exploded view.

The diagrammatically illustrated rotor blade 1 in FIG. 2 which can also be referred to as a divided rotor blade 1 has a rotor blade inner part 2 and a rotor blade outer part 4. In addition the Figure shows an inner trailing edge segment 6 which is to be fixed to the rotor blade inner part, and correspondingly there is an outer trailing edge segment 8 which is to be fixed to the rotor blade outer part 4.

The rotor blade inner part 2 has a connecting flange 10 for fixing the rotor blade inner part to a rotor hub or to a corresponding hub adaptor. In addition there is an outer blade attachment surface 14 on the rotor blade outer part 4 for attachment to an inner blade attachment surface 12 which can be seen in FIG. 3. The rotor blade inner part 2 can thus be connected to the rotor blade outer part 4 in such a way that the inner blade attachment surface 12 is fitted to the outer blade attachment surface 14 and this therefore provides for fixing and in particular bracing the two rotor blade parts.

Figure 3:
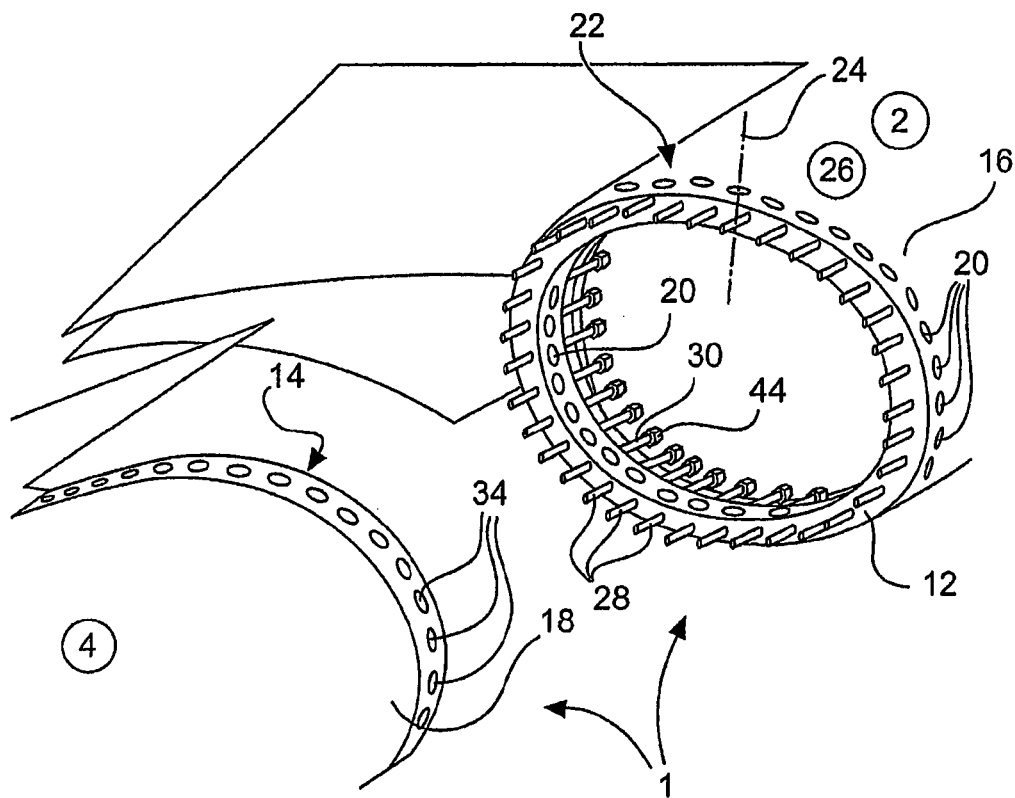
FIG. 3 shows a portion of a divided rotor blade.

FIG. 3 shows a portion of a divided rotor blade 1, namely substantially an inner blade fixing region 16 of the rotor blade inner part 2 which also involves the inner blade attachment surface 12. FIG. 3 also shows an outer blade fixing region 18 of the rotor blade outer part 4 which also has an outer blade attachment surface 14.

To connect the rotor blade inner part 2 to the rotor blade outer part 4 the inner blade attachment surface 12 and the outer blade attachment surface 14 are brought together. For fixing purposes the rotor blade inner part 2 in its inner blade fixing region 16 has a plurality of counterpart elements 20 which here are in the form of transverse bolts. In the illustrated example there are 36 such transverse bolts. These counterpart elements 20 in the form of transverse bolts respectively form a part of a connecting device. The counterpart elements 20 are respectively arranged in the inner blade shell 22 in the region of the inner blade fixing region 16. The inner blade shell 22 is thus of a very great material thickness to receive the counterpart elements 20 in the region of the inner blade fixing region 16 and thus also in the region of the inner blade attachment surface 12. The counterpart elements 20 are arranged basically in a ring form and are disposed basically with their bolt axis 24 perpendicularly to the inner blade shell 22 and thus perpendicularly to a blade surface 26 in the inner blade shell.

Provided as further fixing elements which are described in greater detail in particular in FIG. 4, for each counterpart element 20, are a connecting bolt 28, an expansion sleeve 30 and a bracing element 44 which can also be referred to as a clamping element and which here is in the form of a clamping screw nut. The connecting bolt 28 extends through the inner blade fixing region 16, the counterpart element 20, the expansion sleeve 30 to the bracing element 44 and can extend through the bracing element 44.

Provided in the rotor blade outer part 4 in the outer blade fixing region 18, 36 are anchoring elements 34 which are respectively intended to accommodate a connecting bolt 28.

An anchoring element 34 with a connecting bolt 28, a counterpart element 20, an expansion sleeve 30 and a bracing element 44 basically together form a connecting device.

FIG. 4 shows a portion of a rotor blade inner part 2 with a rotor blade outer part 4 which fitted together are fixedly connected to each other. That portion shows a side view and essentially shows a part of the inner part fixing region 16 and the outer blade fixing region 18 which here are suitably connected together.

In that respect FIG. 4 shows only a part of a peripherally extending rotor blade shell, wherein in the view in FIG. 4 the rotor blade surface 26 and thus the outside of the rotor blade 1 are shown upwardly, while a rotor blade inward side 36 is shown downwardly in FIG. 4.

The rotor blade inner part 2 and the rotor blade outer part 4 are fitted together at their inner blade connecting surface 12 and the outer blade connecting surface 14. That attachment region can be referred to as the separating location 38. For fixing the rotor blade inner part 2 and the rotor blade outer part 4 together, there is an anchoring element 34, that is to say a transverse bolt, in the outer blade fixing region 18. The connecting bolt 28 is fixedly screwed in the anchoring element 34 in a bolt thread 40 and the two elements are thus fixedly connected together. The connecting bolt 28 can be in the form of a threaded bolt and/or can be provided at its ends with a thread.

From the anchoring element 34 the connecting bolt 28 extends to the rotor blade inner part 2. In this case the connecting bolt 28 extends transversely through the inner blade attachment surface 12 and the outer blade attachment surface 14 and thus transversely through the separating location 38.

In the rotor blade inner part 2 the connecting bolt 28 extends through the counterpart element 20, wherein the counterpart element 20 is also substantially in the form of a bolt. The connecting bolt 28 further extends through the inner blade fixing region 16 so that it projects clearly into the internal space 46 in the rotor blade inner part 2. For bracing purposes an expansion sleeve 30 is firstly pushed on the connecting bolt 28 which can also be referred to as the longitudinal bore 28, the sleeve 30 extending to the counterpart element 20. In this case the expansion sleeve 30 bears against a flattened region 42 which can also be referred to as a sleeve receiving means. In addition, a bracing element 44, namely a screw nut, is screwed on the connecting bolt 28, the bracing element 44 upon being tightened pushing the expansion sleeve 30 against the counterpart element 20 or thereby pulling the anchoring element 34 and therewith the rotor blade outer part 4 to the rotor blade inner part 2.

The use of the expansion sleeve 30 provides that it can yield to any slight fatigue phenomena of the material, correspondingly expands and prevents loosening or release of the connection. The expansion sleeve 30 used inter alia also provides that the bracing element, namely the screw nut or clamping nut, is arranged in the internal space 46, and is at least easily accessible from the internal space 46 in the rotor blade inner part 2. A service employee can thus perform a bracing operation and can thus tighten the connection of the two rotor blades 2 and 4 to each other, from the internal space 46 in the rotor blade inner part 2.

Preferably the rotor blade 1 is of such a configuration in the connecting region that the sizes of the counterpart element 20 and the anchoring element 34 are substantially the same, in particular both being in the form of transverse bolts of approximately identical size, namely of a length and cross-section which as far as possible are the same, as shown in FIG. 4. In addition an advantageous configuration is one in which a spacing from the anchoring element 34 to the outer blade attachment surface 14 is approximately precisely the same as a spacing from the counterpart element 20 to the inner blade attachment surface 12.

In principle the connecting bolt 28 or longitudinal bore 28 is guided in a corresponding longitudinal bore 48. The longitudinal bore 48 functionally forms in that respect a single object when the connecting or longitudinal bolt 28 is guided completely thereon. In actual fact however that longitudinal bore 48 is provided both in the inner blade fixing region 16 and also in the outer blade fixing region, which usually would have to be implemented in a plurality of working steps. The longitudinal bore 48 can also be of different diameters, namely in particular it can involve a larger diameter in the region of the expansion sleeve 30. Where no expansion sleeve 30 is provided the diameter of the longitudinal bore can be adapted to the outside diameter of the connecting bolt 28. To simplify manufacture it is proposed that the longitudinal bore, in the region between the counterpart element 20 and the inner blade attachment surface 12, is of the same diameter as in the region of the expansion sleeve 30. In that case those two portions of the longitudinal bore 48 can be provided in one working operation and in particular with a boring tool. Purely as a precaution it is pointed out that the term bore does not necessarily signify that this bore was actually also produced by a boring or drilling operation.

In FIG. 4 it is also possible to see the increased material thickness of the inner blade fixing region 16 and the outer blade fixing region 18 respectively with respect to the material thickness of the rest of the blade shell 50 and 52 of the rotor blade inner part 2 and the rotor blade outer part 4 respectively. In particular the counterpart element 20 and the anchoring element 34 can be accommodated by virtue of that greater material thickness. In addition it is possible as a result for the connecting bolt 28 which is passed along in relation to the rotor blade surface 26 to issue from the inner blade fixing region 16 into the internal space 46.

FIG. 5 shows a plan view of an inner blade attachment surface 12 in which there are 36 connecting devices and thus connecting bolts 28 and thus longitudinal bores 48.

Figure 6:
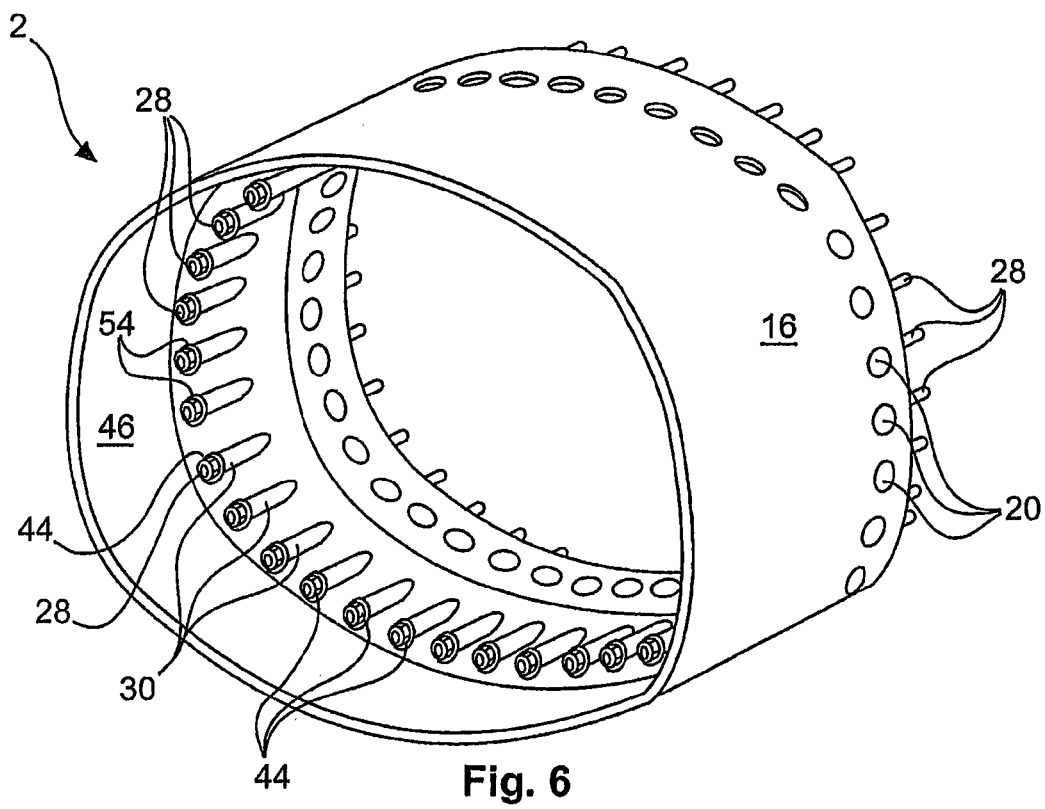
FIG. 6 shows a perspective view of a connecting region of a rotor blade inner part.

The perspective view in FIG. 6 only shows essentially the inner blade fixing region 16. In contrast to the illustrative view in FIG. 6 however the inner blade fixing region is not produced separately from the rotor blade inner part 2.

Besides the connecting bolts 28, the view shows the counterpart elements 20, in particular the expansion sleeves 30 projecting from the material of the inner blade fixing region 16. In this arrangement the expansion sleeves 30 project into the internal region 46 of the rotor blade inner part 2 and thus the bracing element 44 (bracing nuts or clamping elements) are also readily accessible. Support washers 54 can be provided between the nuts and the expansion sleeves 30. In an embodiment, instead of the support washers or additionally thereto, there can be provided auxiliary means for a hydraulic tightening process such as for example an approximately conical washer for increasing the size of an end support surface on the expansion sleeve 30 for the fitment of a hydraulic clamping tool.

Figure 7:
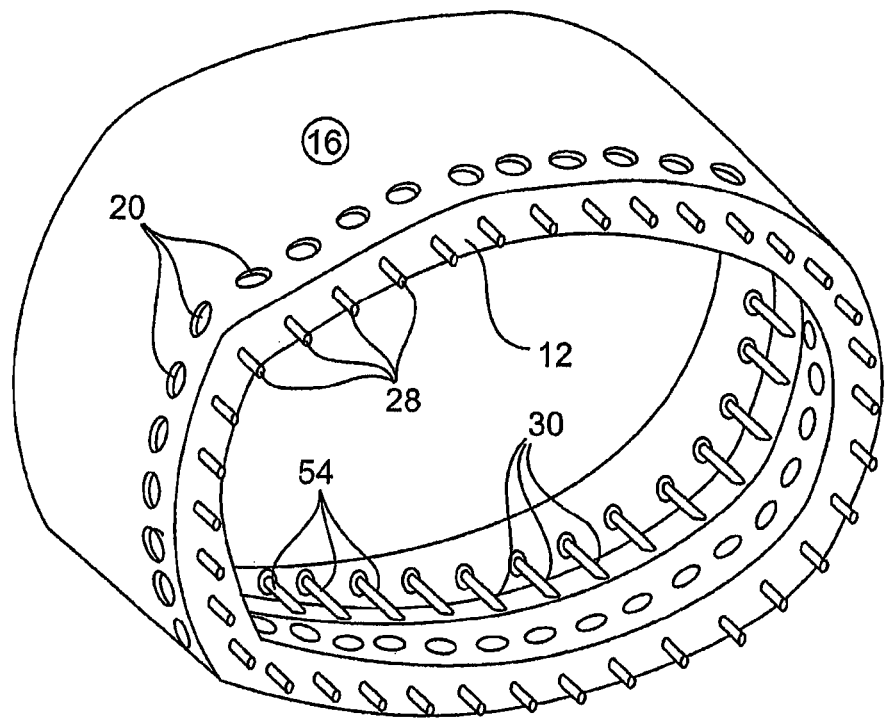
FIG. 7 shows a further perspective view of a connecting region of a rotor blade inner part.

FIG. 7 shows only a different perspective in relation to FIG. 6, illustrating in particular the connecting bolts 28 protruding from the inner blade fixing region 16 from the inner blade attachment surface 12. In spite of the view adopted here however it is proposed that an actual connection for the rotor blade inner part 2 to the rotor blade outer part 4 is implemented in such a way that the connecting bolts 28 are firstly fixed in the anchoring element 34 in the rotor blade outer part 4 in order then to be introduced into the rotor blade inner part. Alternatively the rotor blade inner part 2 and the rotor blade outer part 4 can be fitted together and connecting bolts can be inserted from the internal space 46 in the blade inner part 2 through the respective longitudinal bore 48 and passed to the anchoring element 34 in order then to be fixed in the anchoring element 34, in particular by being screwed therein. Subsequently an expansion sleeve 30 and then a clamping nut can be fitted on and tightened.

Figure 8:
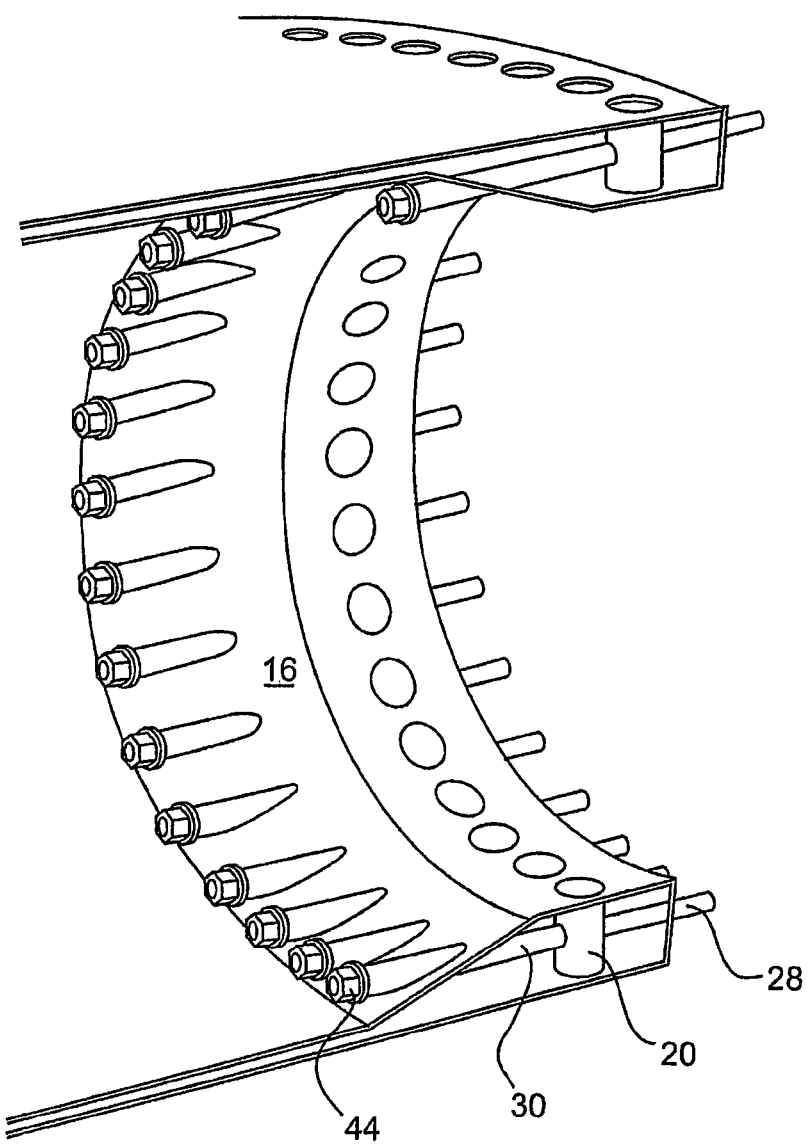
FIG. 8 shows a perspective sectional view of a connecting region of a rotor blade inner part.

FIG. 8 shows a partly sectional perspective view by way of illustration of an inner blade fixing region 16. The connecting bolt 28, the counterpart element 20, the expansion sleeve 30 and the bracing element 44 (clamping nut) can also be seen in perspective in the view, at least at two locations. Only the view involves a hollow space in the region of the inner blade fixing region 16 and thus in the region of the counterpart element 20 and in part the expansion sleeve 30. That serves for illustration purposes and in actual fact a solid material is at least preferably adopted for the inner blade fixing region 16, in particular fiber-reinforced plastic like glass fiber-reinforced plastic or carbon fiber-reinforced plastic. In particular the material adopted in the inner blade fixing region is the same as in the remaining part of the rotor blade inner part or in large parts thereof. Preferably the same correspondingly applies to the rotor blade outer part.

According to one embodiment of the invention therefore there is proposed an advantageous connection between a rotor blade inner part and a rotor blade outer part. This can also be referred to as a connection between an inner blade and an outer blade. In particular it is proposed that the outer blade is provided with a transverse bolt connection in which a transverse bolt is provided with a thread for a longitudinal bolt. The inner blade is also provided with transverse bolts which however do not have a thread for longitudinal bolts or it is provided with through bores and a flat support surface for expansion sleeves, which surface is directed to the installation center point, with screwing being effected from the inner blade.

It is advantageous in particular that screwing is accessible from the interior of the blade, which is advantageous for maintenance and assembly. Fixing can be effected in such a way as to result in the contour of the outside surface of the rotor blade being influenced only slightly or indeed not at all. The process also permits automatable production.

Thus by virtue of the proposed solutions, it is possible to divide a rotor blade so that this gives two shorter parts. Those shortened parts can be in particular more easily transported. In principle such a rotor blade can be suitably divided from the outset into two parts in the course of manufacture or the rotor blade is produced in one piece and subsequently separated at a suitable connecting location. It is already possible to implement, in the region of that connecting location, precautionary measures for making the connection such as for example the introduction of the transverse bolts, namely the counterpart elements and/or the anchoring elements 20 and 34 respectively. A connecting option in respect of rotor blade parts, namely the outer blade and the inner blade, is afforded, in which the two rotor blade parts can be made from fiber-reinforced plastic. In that respect the two parts can be made from the same or a different fiber-reinforced plastic. Thus in principle this also makes it possible to connect a carbon fiber-reinforced plastic part to a glass fiber-reinforced plastic part.

That makes it possible to facilitate transportation of the rotor blades and smaller cranes can possibly be used in construction. In that way it may also become possible to make regions which involve difficult access such as for example mountain areas better or easier to reach.

In addition, rail transport is now also made possible for long rotor blades, in particular those which are over 45 meters long. Reductions in transport and assembly costs can also be advantageous, as well as an improvement in accessibility of erection locations which are difficult to reach.

Figure 9:
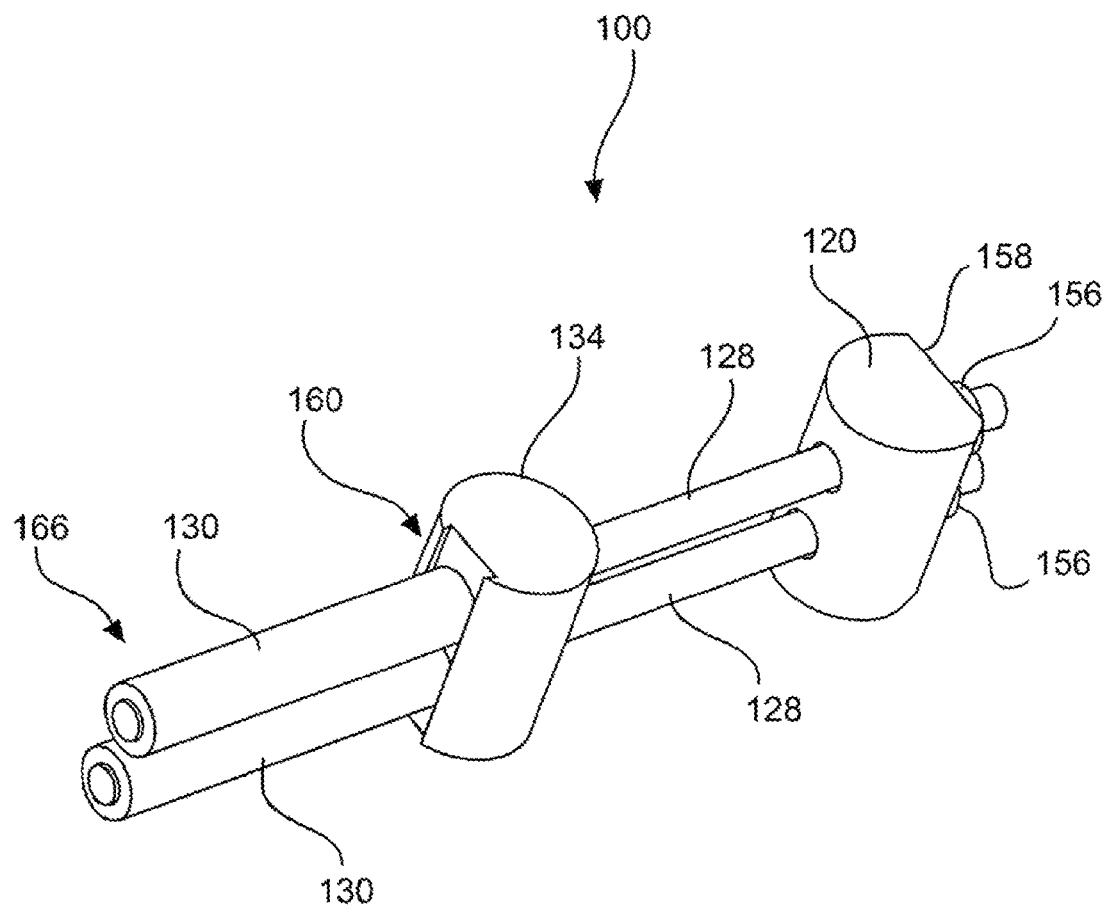
FIG. 9 shows a perspective view of a connecting device according to a second embodiment of the invention.

FIG. 9 shows a connecting device 100 according to a further embodiment. This connecting device 100 includes an anchoring element 134 and a counterpart element 120 which are connected together by way of two connecting bolts 128 and which in proper appropriate use thereof can be braced against each other. In that respect in proper use thereof the anchoring element 134 is to be arranged in a rotor blade outer part and the counterpart element 120 is to be arranged in a rotor blade inner part, or vice-versa, in order thereby to fixedly connect the rotor blade inner part and the rotor blade outer part together. The connecting bolts 128 are fixed at the counterpart element 120 by extending from the anchoring segment 134 through the counterpart element 120 to a fixing means 156 fitted thereon. The fixing means 156 which can be in the form of a screw nut and screwed on bears against a contact surface 158 of the counterpart element 120. The fixing element 156 also forms a bracing element and can be tightened for bracing purposes.

Each connecting bolt 128 also extends through the anchoring element 134 and is provided with an expansion sleeve 130 which bears against a contact pressure region 160 of the anchoring element 134. The counterpart element 120 and the anchoring element 134 are thus disposed between the expansion sleeves 130 and the fixing means 156. The use of two connecting bolts 128 for this connecting device 100 means that a clamping force can be respectively applied at two locations to the counterpart element 120 and the anchoring element 134 respectively. Each anchoring element 134 and counterpart element 120 can be correspondingly longer to apply a clamping force to a rotor blade inner part and a rotor blade outer part respectively over an area which is as large as possible.

The expansion sleeve 130 which as shown in FIG. 9 is fitted onto the connecting bolt 128 has, at its end remote from the anchoring element 134, a threaded portion 166 with female thread, into which the connecting bolt is screwed. Alternatively the expansion sleeve can also be held by a corresponding head of the connecting bolt 128, or can be held and braced by a bracing means arranged there, such as for example a screw nut.

Figure 10:
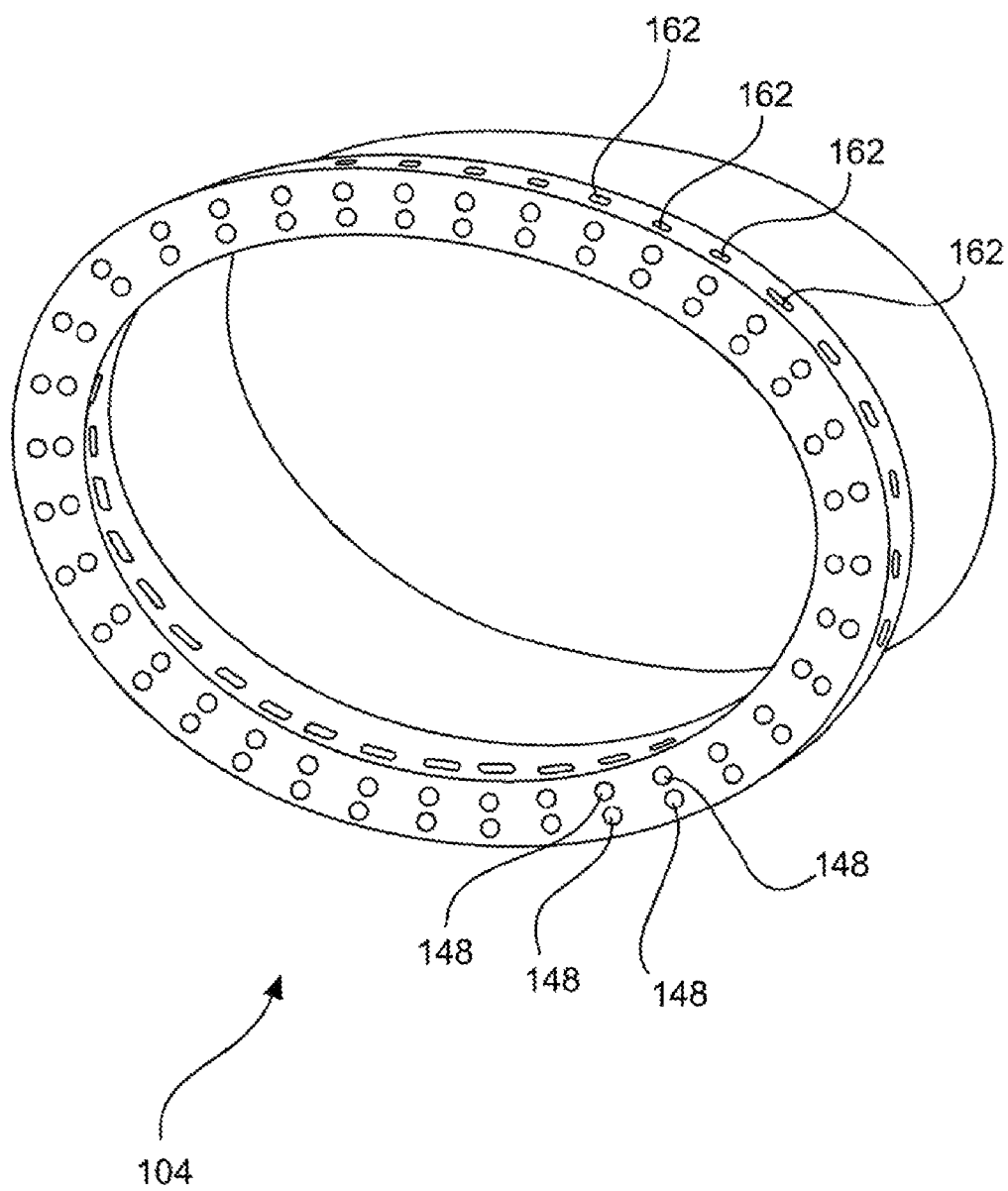
FIG. 10 shows a perspective view of a part of a connecting region of a rotor blade outer part according to the second embodiment of the invention.
Figure 13:
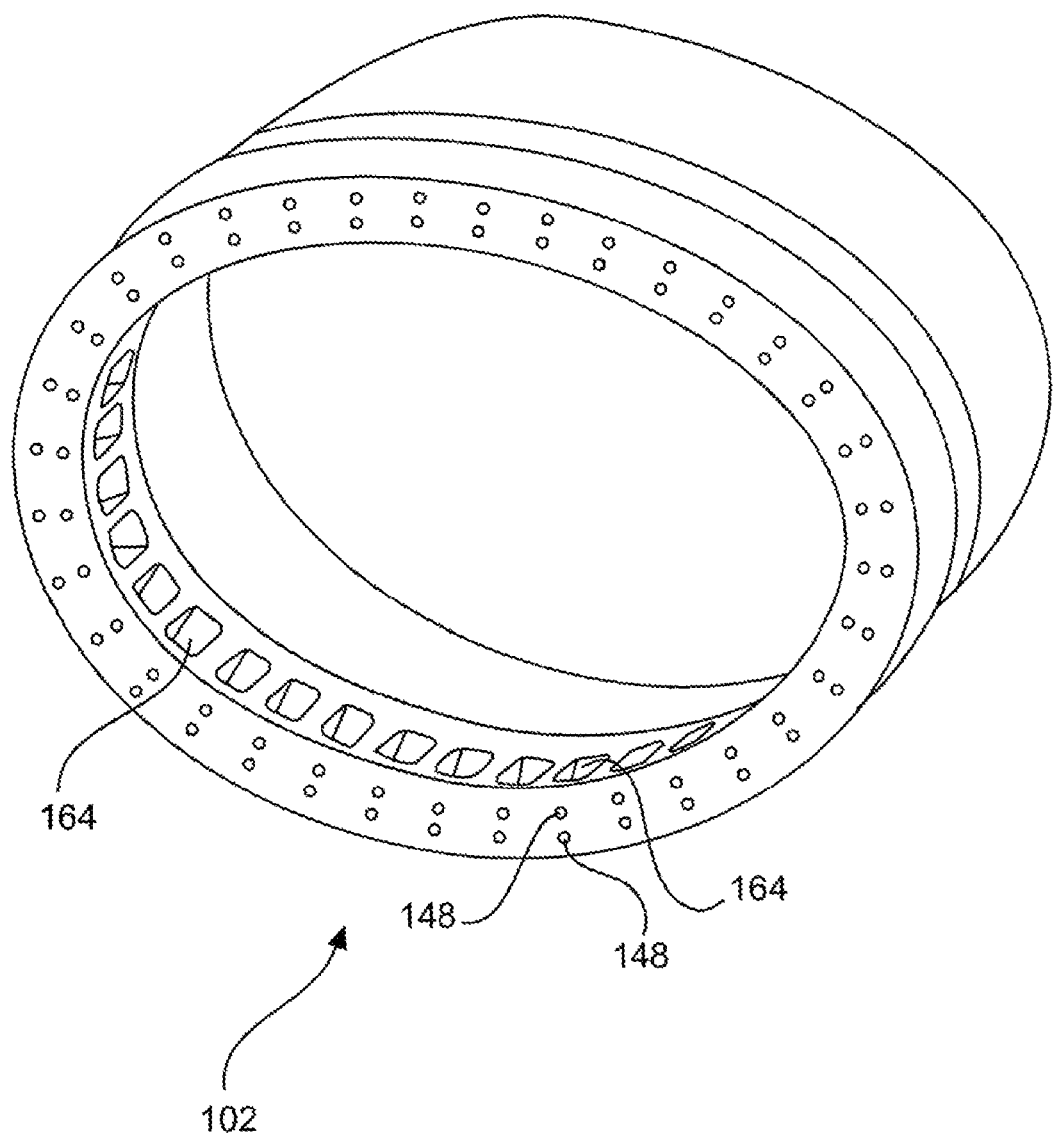
FIG. 13 shows a perspective view of a part of a connecting region of a rotor blade inner part according to the second embodiment of the invention.
Figure 14:
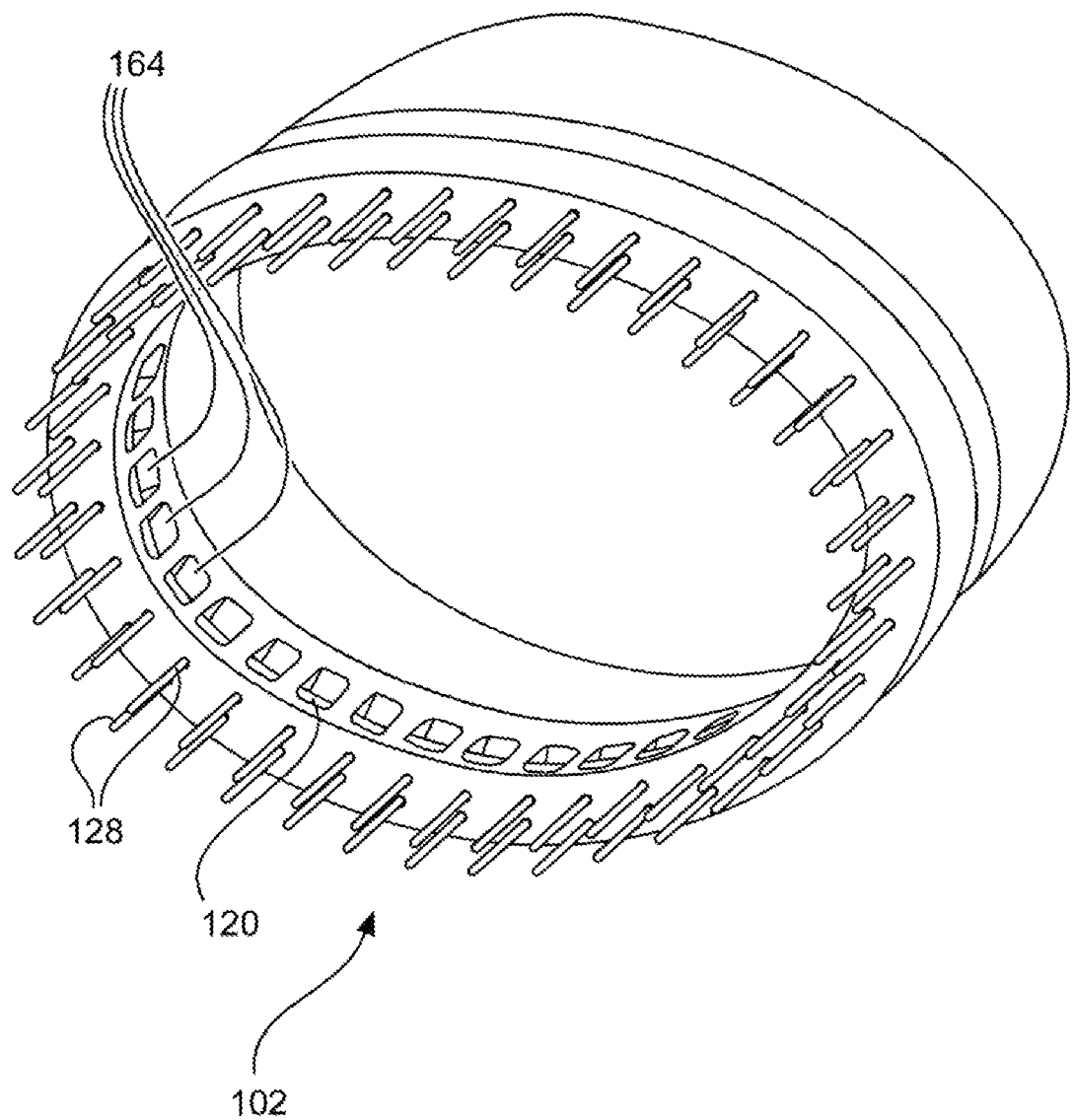
FIG. 14 shows the part of the connecting region of FIG. 13 with inserted parts of connecting devices.

FIG. 10 shows a part of a rotor blade outer part 104. For connecting that rotor blade outer part 104 to a rotor blade inner part 102 which is illustrated in FIGS. 13 and 14, there are a plurality of transverse bores 162 for respectively receiving an anchoring element 134. Longitudinal bores 148 are provided for passing a connecting bolt 128 therethrough, namely two longitudinal bores 148 for a respective transverse bore 162. All longitudinal bores 148 thus form a peripherally extending, two-row arrangement of those longitudinal bores 148.

Figure 11:
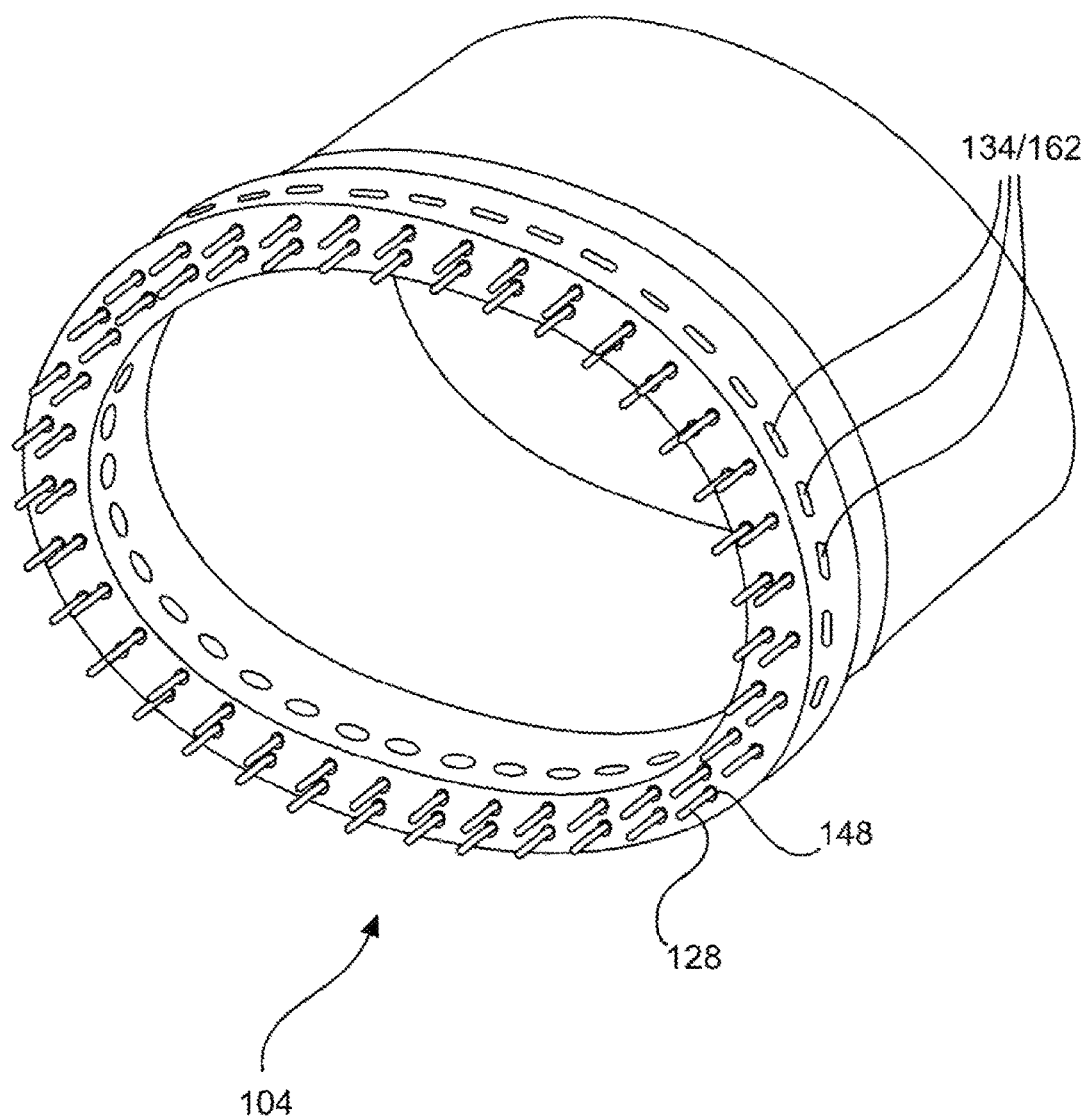
FIG. 11 shows the part of the connecting region of FIG. 10 with inserted parts of connecting devices.

FIG. 11 shows a perspective view which is turned somewhat relative FIG. 10 to illustrate the part of the rotor blade outer part 104 in FIG. 10 with inserted parts of the connecting device 100 of FIG. 9. Of same, a respective anchoring element 134 is fitted into a transverse bore 162. In addition a respective connecting bolt 128 is passed through each longitudinal bore 148. Expansion sleeves 130 are not shown in FIG. 11.

Figure 12:
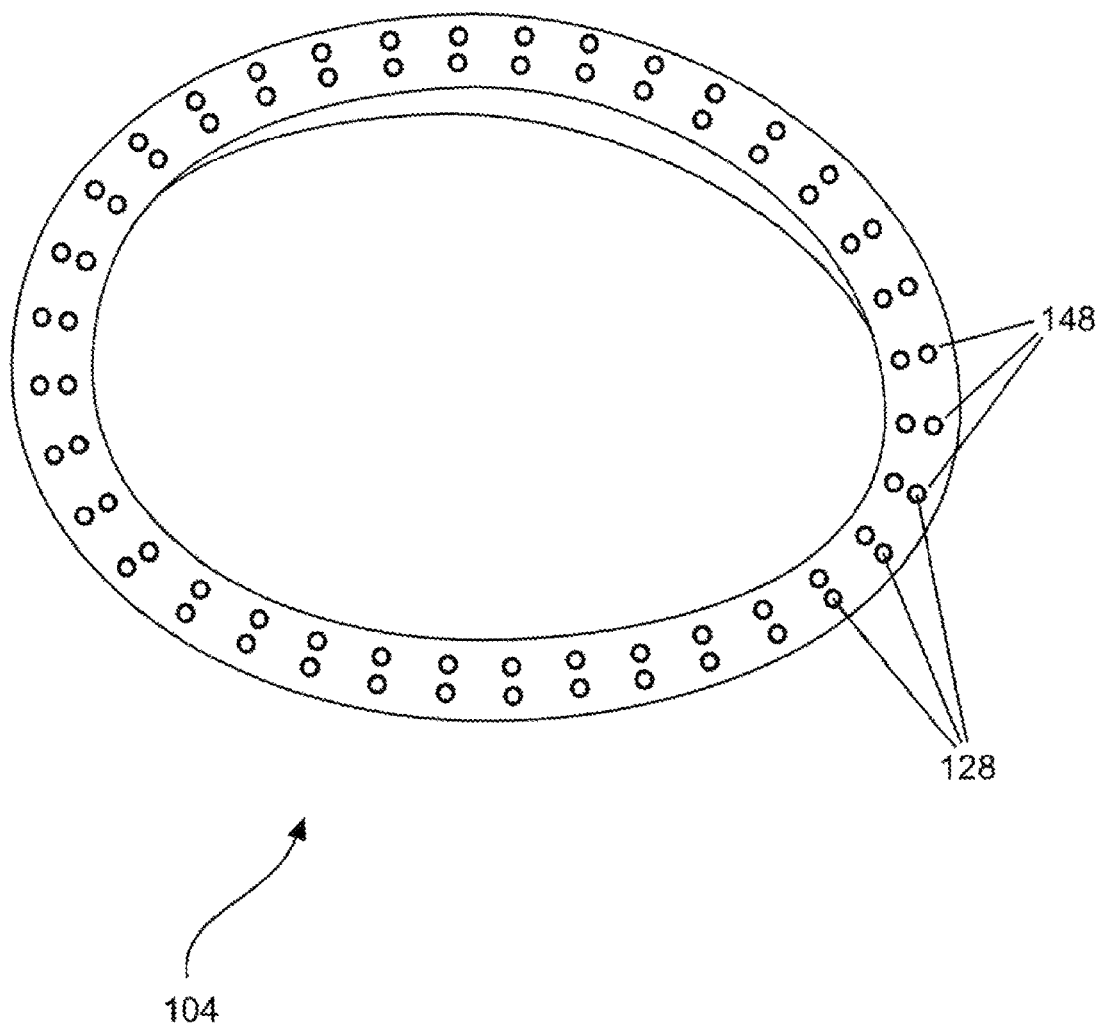
FIG. 12 shows an axial plan view on the connecting region of FIG. 11.

FIG. 12 shows an axial view of the part illustrated in FIG. 11 of the rotor blade outer part 104. In this axial plan view of the connecting region it is possible to see the many longitudinal bores 148 and the connecting bolts 128 arranged therein.

FIG. 13 shows a part of a rotor blade inner part 102 with transverse receiving means 164 for receiving a respective counterpart element 120. It can be seen that the transverse receiving means 164 has only one opening to the internal space in the rotor blade inner part 102. For comparison attention is directed to the transverse bore 162 in the rotor blade outer part 104, which respectively extends completely from the outside inwardly.

Each transverse receiving means 164 also has two longitudinal bores 148. The same reference numeral has been selected for those longitudinal bores in the rotor blade inner part 102, as for the longitudinal bores 148 in the rotor blade outer part 104 in order to make it clear that, of a connecting device 100, a respective connecting bolt 128 extends through such a longitudinal bore 148 in the rotor blade inner part 102 and also through a correspondingly arranged longitudinal bore 148 in the rotor blade outer part 104.

FIG. 14 shows the rotor blade inner part 102 with parts of inserted connecting devices 100, namely with a respective counterpart element 120 and two connecting bolts 128. It is possible to see that a great deal of free space has remained beside the counterpart element 120 and therebehind. That space can be used to accommodate the fixing means 156 or bracing means 156 and possibly also to afford space for tightening same in order to brace the connecting device 100. Those transverse receiving means 164 which in that respect are generous are therefore preferably arranged in the rotor blade inner part in order to implement bracing therefrom, using the fixing means 156. For that purpose the fixing means 156 are arranged in the rotor blade inner part 102 and can thus be better reached, in comparison with a theoretical arrangement thereof in the rotor blade outer part.

The described expansion sleeves 130 shown in FIG. 9 can receive and provide a bracing stress and can maintain a clamping force in particular in the event of slight, for example thermal, changes in length of the connecting bolt 128, or other relevant elements. In that respect it is basically immaterial whether bracing is effected on the part of the expansion sleeve 30 or 130 or in or at the fixing means 156. Bracing in the rotor blade inner part 102 and this in accordance with the illustrated embodiment at the fixing means 156 or bracing means 156 is in that respect an advantageous embodiment.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rotor blade of a wind power installation for fixing to a rotor hub and having a rotor blade longitudinal axis, the rotor blade comprising:
   a single, integral rotor blade inner part having an end configured to be coupled to the rotor hub or an adaptor coupled to the rotor hub;
   a rotor blade outer part located away from the rotor hub; and
   at least one connecting device that couples the rotor blade inner part and the rotor blade outer part together, the at least one connecting device including:
      at least one anchoring element anchored in the rotor blade outer part,
      at least one counterpart element anchored in the rotor blade inner part, and
      at least one connecting bolt that extends through the at least one counterpart element and is fixed to the at least one anchoring element, wherein:
      at least one of the rotor blade outer part and the rotor blade inner part has in a region of the at least one anchoring element or the at least one counterpart element, respectively, an anchoring region with increased material thickness of a rotor blade shell in relation to material thickness of a remainder of the rotor blade shell, and wherein provided in the anchoring region for the at least one connecting device is a longitudinal bore extending parallel to the rotor blade longitudinal axis, wherein:
         the longitudinal bore in the rotor blade inner part extends from an abutment surface for connecting to the rotor blade outer part completely through the anchoring region to end in an inner region of the rotor blade inner part, a thickness of the rotor blade inner part, at radial positions, gradually reduces from the anchoring region to the inner region allowing an end of the longitudinal bore to emerge completely in the inner region so that the at least one connecting bolt can extend through the longitudinal bore from the abutment surface into the inner region, wherein an end of the longitudinal bore emerges into the inner region through a portion of the rotor blade inner part in which the thickness gradually reduces, and wherein the at least one connecting bolt extends through the longitudinal bore in the portion in which the thickness gradually reduces.

2. The rotor blade according to claim 1 wherein at least one of the rotor blade inner part and the rotor blade outer part comprise a fiber-reinforced plastic.

3. The rotor blade according to claim 1 wherein the anchoring element includes at least one of:
   a transverse bolt having a bolt axis transverse to the rotor blade longitudinal axis, and
   a bore arranged transversely relative to the bolt axis and parallel to a rotor blade surface and having a female thread for fixingly receiving the at least one connecting bolt.

4. The rotor blade according to claim 1 wherein the at least one counterpart element includes at least one of:
   a transverse bolt having a bolt axis transverse to the rotor blade longitudinal axis, and
   a through bore arranged transversely relative to the bolt axis for passing the at least one connecting bolt therethrough.

5. The rotor blade according to claim 1 wherein the at least one connecting bolt is fixed to the at least one anchoring element and projects from the at least one anchoring element through the at least one counterpart element, and further comprising a clamping means located at a side of the at least one counterpart element that is away from the at least one anchoring element, the clamping means being configured to brace against an expansion sleeve, wherein in response to the clamping means bracing against the expansion sleeve, the expansion sleeve braces against the at least one counterpart element to pull the at least one anchoring element and the at least one counterpart element against each other.

6. The rotor blade according to claim 5, wherein the at least one connecting bolt is screwed to the at least one anchoring element, wherein the clamping means is a screw nut.

7. The rotor blade according to claim 6 wherein a through bore of the at least one counterpart element has a flattened contact surface for receiving the expansion sleeve.

8. The rotor blade according to claim 1 wherein the at least one connecting device is one of a plurality of connecting devices, wherein a plurality of anchoring elements and counterpart elements are arranged in a plurality of rows and having a connecting bolt therein.

9. The rotor blade according to claim 1 wherein the at least one connecting bolt is fixed to the at least one anchoring element by a threaded coupling.

10. The rotor blade according to claim 1 wherein the at least one connecting bolt extends through the at least one anchoring element and in to an expansion sleeve and is threadedly coupled to the expansion sleeve at a fixing portion.

11. The rotor blade according to claim 1, wherein the longitudinal bore in the rotor blade outer part extends from an abutment surface for fitting the rotor blade inner part to a transverse bore and is configured to receive the anchoring element so that the at least one connecting bolt can extend from the abutment surface to the anchoring element.

12. A connecting device for connecting a single, integral rotor blade inner part to a rotor blade outer part, the connecting device comprising:
   an anchoring element to be anchored in the rotor blade outer part,
   a counterpart element to be anchored in the single, integral rotor blade inner part, and
   a connecting bolt that extends through the counterpart element and is configured to be fixed to the anchoring element thereby fixing the counterpart element to the anchoring element, wherein:
      at least one of the rotor blade outer part and the rotor blade inner part has in a region of the anchoring element or the counterpart element, respectively, an anchoring region with increased material thickness of a rotor blade shell in relation to material thickness of a remainder of the rotor blade shell, and wherein provided in the anchoring region for the connecting device is a longitudinal bore extending parallel to the rotor blade longitudinal axis, wherein:
         the longitudinal bore in the rotor blade inner part extends from an abutment surface for connecting to the rotor blade outer part completely through the anchoring region to end in an inner region of the rotor blade inner part, a thickness of the rotor blade inner part, at radial positions, gradually reduces from the anchoring region to the inner region allowing an end of the longitudinal bore to emerge completely in the inner region so that the connecting bolt can extend through the longitudinal bore from the abutment surface into the inner region, wherein an end of the longitudinal bore emerges into the inner region through a portion of the rotor blade inner part in which the thickness gradually reduces, and wherein the connecting bolt extends through the longitudinal bore in the portion in which the thickness gradually reduces.

13. The connecting device according to claim 12 wherein the connecting device has a plurality of anchoring elements, a plurality of counterpart elements and a plurality of connecting bolts for connecting the anchoring element to the counterpart element.

14. The connecting device according to claim 12, wherein the longitudinal bore in the rotor blade outer part extends from an abutment surface for fitting the rotor blade inner part to a transverse bore and is configured to receive the anchoring element so that the connecting bolt can extend from the abutment surface to the anchoring element.

15. A wind power installation comprising:
a rotor hub; and
a rotor having at least one rotor blade that includes:
    a single, integral rotor blade inner part having a root portion coupled to the rotor hub;
    a rotor blade outer part located away from the rotor hub; and
    a connecting device that couples the rotor blade inner part to the rotor blade outer part, the connecting device including:
        an anchoring element anchored in one of the rotor blade outer part and the rotor blade inner part,
        a counterpart element anchored in the other of the rotor blade outer part and the rotor blade inner part, and
        a connecting bolt that extends through the counterpart element and is fixed to the anchoring element, wherein:
        at least one of the rotor blade outer part and the rotor blade inner part has in a region of the anchoring element or the counterpart element, respectively, an anchoring region with increased material thickness of a rotor blade shell in relation to material thickness of a remainder of the rotor blade shell, and wherein provided in the anchoring region for the connecting device is a longitudinal bore extending parallel to the rotor blade longitudinal axis; and
        the longitudinal bore in the rotor blade inner part extends from an abutment surface for connecting to the rotor blade outer part completely through the anchoring region to end in an inner region of the rotor blade inner part, a thickness of the rotor blade inner part, at radial positions, gradually reduces from the anchoring region to the inner region allowing an end of the longitudinal bore to emerge completely in the inner region so that the connecting bolt can extend through the longitudinal bore from the abutment surface into the inner region, wherein an end of the longitudinal bore emerges into the inner region through a portion of the rotor blade inner part in which the thickness gradually reduces, and wherein the connecting bolt extends through the longitudinal bore in the portion in which the thickness gradually reduces.

16. The wind power installation according to claim 15 comprising a plurality of connecting devices that each include a plurality of anchoring elements anchored around a perimeter of one of the rotor blade outer part and the rotor blade inner part and a plurality of counterpart elements anchored in the other of the rotor blade outer part and the rotor blade inner part.

17. The wind power installation according to claim 16 wherein the plurality of anchoring elements and the plurality of counterpart elements are arranged in rows.

18. The wind power installation of claim 15, wherein:
the longitudinal bore in the rotor blade outer part extends from an abutment surface for fitting the rotor blade inner part to a transverse bore and is configured to receive the anchoring element so that the connecting bolt can extend from the abutment surface to the anchoring element.

19. A rotor blade of a wind power installation for fixing to a rotor hub and having a rotor blade longitudinal axis, the rotor blade comprising:
a single, integral rotor blade inner part having an end configured to be coupled to the rotor hub;
a rotor blade outer part located away from the rotor hub;
an anchoring element coupled to one of the rotor blade inner part and the rotor blade outer part;
a counterpart element coupled to the other of the rotor blade inner part and the rotor blade outer part; and
a plurality of connecting bolts that extends through the counterpart element and are fixed to the anchoring element, wherein:
    at least one of the rotor blade outer part and the rotor blade inner part has in a region of the anchoring element or the counterpart element, respectively, an anchoring region with increased material thickness of a rotor blade shell in relation to material thickness of a remainder of the rotor blade shell, and wherein provided in the anchoring region for the plurality of connecting bolts are a respective plurality of longitudinal bores extending parallel to the rotor blade longitudinal axis; and
    a longitudinal bore of the plurality of longitudinal bores in the rotor blade inner part extends from an abutment surface for connecting to the rotor blade outer part completely through the anchoring region to end in an inner region of the rotor blade inner part, a thickness of the rotor blade inner part, at radial positions, gradually reduces from the anchoring region to the inner region allowing an end of the longitudinal bore to emerge completely in the inner region so that the respective connecting bolt of the plurality of connecting bolts extends through the longitudinal bore from the abutment surface into the inner region, wherein an end of the longitudinal bore emerges into the inner region through a portion of the rotor blade inner part in which the thickness gradually reduces, and wherein the respective connecting bolt of the plurality of connecting bolts extends through the longitudinal bore in the portion in which the thickness gradually reduces.

20. The rotor blade of the wind power installation according to claim 19, wherein the rotor blade inner part and the rotor blade outer part comprise at least one of fiber-reinforced plastic, glass fiber-reinforced plastic, and carbon fiber-reinforced plastic.

21. The rotor blade of claim 19, wherein
the longitudinal bore of the plurality of longitudinal bores in the rotor blade outer part extends from an abutment surface for fitting the rotor blade inner part to a transverse bore and is configured to receive the anchoring element so that a respective connecting bolt of the plurality of connecting bolts can extend from the abutment surface to the anchoring element.

\* \* \* \* \*